(12) United States Patent
Itskovich (10) Patent No.: US 9,310,511 B2
(45) Date of Patent: Apr. 12, 2016

(54) APPARATUS AND METHOD FOR DEEP TRANSIENT RESISTIVITY MEASUREMENT

(71) Applicant: Gregory Itskovich, Houston, TX (US)

(72) Inventor: Gregory Itskovich, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 779 days.

(21) Appl. No.: 13/666,331

(22) Filed: Nov. 1, 2012

(65) Prior Publication Data

US 2014/0121974 A1    May 1, 2014

(51) Int. Cl.
  *G01V 3/38*   (2006.01)
  *G06F 19/00*   (2011.01)
  *G06F 17/40*   (2006.01)
  *E21B 47/00*   (2012.01)

(52) U.S. Cl.
  CPC . *G01V 3/38* (2013.01); *E21B 47/00* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 4,882,542 A | 11/1989 | Vail, III | |
| 5,065,099 A * | 11/1991 | Sinclair | G01V 3/28 324/339 |
| 5,089,779 A | 2/1992 | Rorden | |
| 5,159,577 A | 10/1992 | Twist | |
| 5,883,515 A | 3/1999 | Strack et al. | |
| 6,541,975 B2 | 4/2003 | Strack | |
| 6,891,376 B2 | 5/2005 | Hanstein et al. | |
| 6,914,433 B2 | 7/2005 | Wright et al. | |
| 7,027,922 B2 | 4/2006 | Bespalov et al. | |
| 7,046,009 B2 | 5/2006 | Itskovich | |
| 7,150,316 B2 | 12/2006 | Itskovich | |
| 7,167,006 B2 | 1/2007 | Itskovich | |
| 7,257,489 B2 | 8/2007 | Hsu et al. | |
| 7,366,616 B2 | 4/2008 | Bennett et al. | |
| 7,411,390 B2 * | 8/2008 | Goldfine | G01V 3/15 324/202 |

(Continued)

FOREIGN PATENT DOCUMENTS

CN    201232545 y    5/2009

OTHER PUBLICATIONS

Notification of Transmittal of the International Search Report and the Written Opinion of the International Searching Authority, or the Declaration; PCT/US2013/067245; Mailed Jan. 23, 2014, 14 pages.

(Continued)

*Primary Examiner* — Edward Cosimano
(74) *Attorney, Agent, or Firm* — Cantor Colburn LLP (57) ABSTRACT

A method of processing electromagnetic signal data includes: receiving transient electromagnetic (TEM) signal data from a downhole tool disposed in an earth formation, the downhole tool including at least one conductive component; estimating an initial bucking coefficient based on relative positions of the at least two receivers; combining the TEM signal data using the initial bucking coefficient to estimate an initial formation signal; selecting a plurality of bucking coefficient values based on the initial bucking coefficient and estimating a plurality of formation signals, each formation signal corresponding to one of the plurality of bucking coefficients; and selecting an optimal bucking coefficient from one of the initial bucking coefficient and the plurality of bucking coefficients based on the plurality of formation signals, the optimal bucking coefficient providing suppression of parasitic signals due to the at least one conductive component.

20 Claims, 7 Drawing Sheets

(56) References Cited

U.S. PATENT DOCUMENTS

| | | |
|---|---|---|
| 7,502,690 B2 | 3/2009 | Thomsen et al. |
| 7,541,813 B2 | 6/2009 | Synder, Jr. et al. |
| 7,583,085 B2 | 9/2009 | Hall et al. |
| 7,659,723 B2 | 2/2010 | Meyer et al. |
| 7,994,790 B2 | 8/2011 | Itskovich et al. |
| 8,035,392 B2 | 10/2011 | Itskovich et al. |
| 8,049,507 B2 | 11/2011 | Rabinovich et al. |
| 2004/0021461 A1* | 2/2004 | Goldfine ............ G01V 3/15 324/243 |
| 2005/0092487 A1 | 5/2005 | Banning et al. |
| 2005/0093547 A1 | 5/2005 | Xiao et al. |
| 2006/0061364 A1 | 3/2006 | Banning et al. |
| 2006/0186887 A1 | 8/2006 | Strack |
| 2007/0108981 A1 | 5/2007 | Banning-Geertsma et al. |
| 2007/0216416 A1 | 9/2007 | Itskovich |
| 2007/0256832 A1 | 11/2007 | Hagiwara et al. |
| 2009/0216454 A1 | 8/2009 | Ziolkowski et al. |
| 2010/0044035 A1 | 2/2010 | Bespalov |
| 2010/0097065 A1 | 4/2010 | Itskovich et al. |
| 2010/0109672 A1 | 5/2010 | Rabinovich et al. |
| 2010/0125439 A1 | 5/2010 | Reiderman et al. |
| 2010/0171501 A1 | 7/2010 | Alumbaugh et al. |
| 2011/0012602 A1 | 1/2011 | Reiderman et al. |
| 2011/0257886 A1 | 10/2011 | Itskovich et al. |

OTHER PUBLICATIONS

Liu, Electromagnetic Logging Technique Based on Borehole Radar, Sep. 2002, vol. 40, No. 9. IEEE Transactions on Geoscience and Remote Sensing.

* cited by examiner

APPARATUS AND METHOD FOR DEEP TRANSIENT RESISTIVITY MEASUREMENT

BACKGROUND

Geologic formations below the surface of the earth may contain reservoirs of oil and gas, which are retrieved by drilling one or more boreholes into the subsurface of the earth. The boreholes are also used to measure various properties of the boreholes and the surrounding subsurface formations.

Deep transient logging while drilling (LWD), especially "look-ahead" capability, has been shown to have a great potential in formation evaluation and measurement, such as in predicting over-pressed zones, detecting faults in front of a drill bit in horizontal wells and profiling salt structures. These applications typically require depth of investigation (DOI) ranges of about 5-50 meters. One challenge that occurs during deep transient LWD operations is the generation of a parasitic signal due to conductive drill collars or other downhole components.

A variety of techniques have been proposed to reduce this signal in acquired data. Exemplary techniques include using ferrite and copper shielding, using reference signal for calibration purposes and using asymptotic behavior of the conductive collar time response to filter out the collar signal.

In the case of the target DOI being up to 50 meters, the conductive collar signal is typically more than two orders of magnitude greater than the formation signal even if ferrite and copper shields are used. Then the accuracy of bucking and filtering may not be sufficient to facilitate measurements.

SUMMARY

A method of processing electromagnetic signal data includes: receiving transient electromagnetic (TEM) signal data representing electromagnetic (EM) signals detected by at least two receivers in a downhole tool disposed in an earth formation in response to inducing a pulsed current in the earth formation, the downhole tool including at least one conductive component; estimating an initial bucking coefficient based on relative positions of the at least two receivers; combining the TEM signal data using the initial bucking coefficient to estimate an initial formation signal; selecting a plurality of bucking coefficient values based on the initial bucking coefficient and estimating a plurality of formation signals, each formation signal corresponding to one of the plurality of bucking coefficients; and selecting an optimal bucking coefficient from one of the initial bucking coefficient and the plurality of bucking coefficients based on the plurality of formation signals, the optimal bucking coefficient providing suppression of parasitic signals due to the at least one conductive component.

An apparatus for processing electromagnetic signal data includes: a downhole tool configured to be disposed in a borehole in an earth formation, the downhole tool including a conductive carrier, a transmitter, a first receiver disposed at a first axial distance $L_1$ from the transmitter, and a second receiver disposed at a second axial distance $L_2$ from the transmitter that is less than the first axial distance; and a processor configured to receive transient electromagnetic (TEM) signal data representing a first EM signal $S_1(t)$ detected by the first receiver and a second EM signal $S_2(t)$ detected by the second receiver in response to inducing a pulsed current in the earth formation. The processor is configured to perform: estimating an initial bucking coefficient based on at least the first axial distance $L_1$ and the second axial distance $L_2$; combining the first EM signal $S_1(t)$ and the second EM signal $S_2(t)$ using the initial bucking coefficient to estimate an initial formation signal; selecting a plurality of bucking coefficient values based on the initial bucking coefficient and estimating a plurality of formation signals, each formation signal corresponding to one of the plurality of bucking coefficients; and selecting an optimal bucking coefficient from one of the initial bucking coefficient and the plurality of bucking coefficients based on the plurality of formation signals, the optimal bucking coefficient providing suppression of parasitic signals due to the at least one conductive component.

A non-transitory computer readable medium includes computer-executable instructions for processing electromagnetic signal data by implementing a method comprising: receiving transient electromagnetic (TEM) signal data representing electromagnetic (EM) signals detected by at least two receivers in a downhole tool disposed in an earth formation in response to inducing a pulsed current in the earth formation, the downhole tool including at least one conductive component; estimating an initial bucking coefficient based on relative positions of the at least two receivers; combining the TEM data using the initial bucking coefficient to estimate an initial formation signal; selecting a plurality of bucking coefficient values based on the initial bucking coefficient and estimating a plurality of formation signals, each formation signal corresponding to one of the plurality of bucking coefficients; and selecting an optimal bucking coefficient from one of the initial bucking coefficient and the plurality of bucking coefficients based on the plurality of formation signals, the optimal bucking coefficient providing suppression of parasitic signals due to the at least one conductive component.

BRIEF DESCRIPTION OF THE DRAWINGS

The following descriptions should not be considered limiting in any way. With reference to the accompanying drawings, like elements are numbered alike.

DETAILED DESCRIPTION

Apparatuses and methods are provided for reducing and/or eliminating parasitic signal data due to downhole components (e.g., conductive drill collars, borehole strings or tool components) from electromagnetic (EM) measurement data. In one embodiment, the apparatuses and methods described herein are utilized with transient EM operations, such as ultra-deep resistivity measurement while drilling. An exemplary method is based on acquiring EM signals from at least a first and second EM receiver that are axially spaced downhole relative to an EM transmitter. In one embodiment, a first EM signal is generated from the first receiver and a second EM signal is generated from the second receiver located closer to the transmitter. The second receiver is combined with a coefficient to generate a transformed signal, which can be subtracted from the first EM signal to generate a corrected EM signal that is free (or at least substantially free) of the parasitic signal.

In one embodiment, the first and second receivers are utilized as a bucking system for effective reduction or elimination of effects of conductive components (e.g., drill pipes) on signals in transient EM measurements (e.g., Pulse Induction LWD). One receiver, such as the first receiver, serves as the main measurement receiver, while another receiver, such as the second receiver, is used to compensate for undesirable effects, e.g., a drill pipe parasitic signal. A correctable bucking coefficient is derived from the raw transient measurements taken by electromagnetic receivers. Bucking is performed by measuring signals by each receiver and then combining the measured signals using the correctable bucking coefficient to derive a formation signal that is substantially unaffected by the conductive component.

Figure 1:
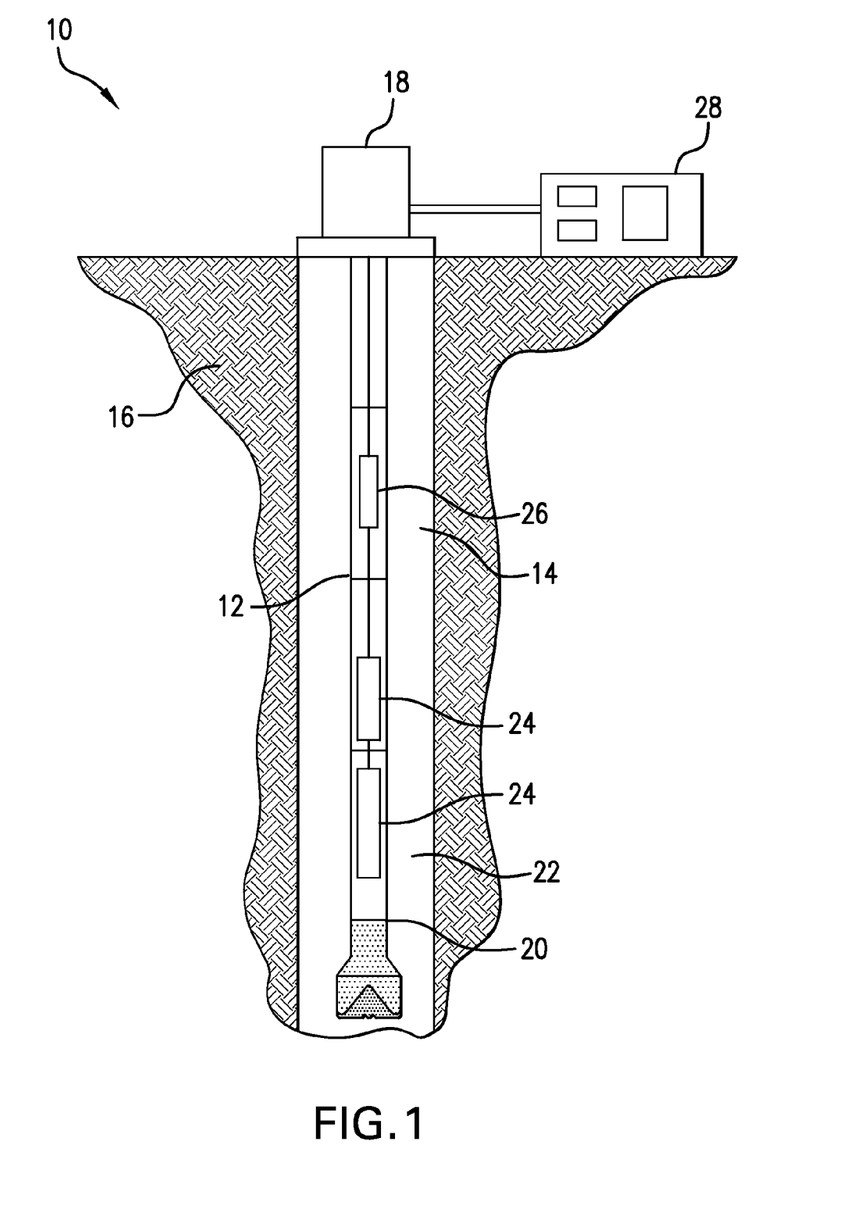
FIG. 1 depicts an exemplary embodiment of a drilling, formation evaluation and/or production system.

Referring to FIG. 1, an exemplary embodiment of a well drilling, logging and/or production system 10 includes a borehole string 12 that is shown disposed in a wellbore or borehole 14 that penetrates at least one earth formation 16 during a drilling or other downhole operation. As described herein, "borehole" or "wellbore" refers to a single hole that makes up all or part of a drilled well. As described herein, "formations" refer to the various features and materials that may be encountered in a subsurface environment and surround the borehole.

A surface structure 18 includes various components such as a wellhead, derrick and/or rotary table or supporting the borehole string, lowering string sections or other downhole components. In one embodiment, the borehole string 12 is a drillstring including one or more drill pipe sections that extend downward into the borehole 14, and is connected to a drilling assembly 20. In one embodiment, system 10 includes any number of downhole tools 24 for various processes including formation drilling, geosteering, and formation evaluation (FE) for measuring versus depth and/or time one or more physical quantities in or around a borehole. The tool 24 may be included in or embodied as a bottomhole assembly (BHA) 22, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 24, the BHA 22 or other portions of the borehole string 12 includes sensor devices configured to measure various parameters of the formation and/or borehole. In one embodiment, the sensor devices include one or more transmitters and receivers configured to transmit and receive electromagnetic signals for measurement of formation properties such as composition, resistivity and permeability. An exemplary measurement technique is a transient EM technique.

In one embodiment, the tool 24, BHA 22 and/or sensor devices include and/or are configured to communicate with a processor to receive, measure and/or estimate directional and other characteristics of the downhole components, borehole and/or the formation. For example, the tool 24 is equipped with transmission equipment to communicate with a processor such as a downhole processor 26 or a surface processing unit 28. Such transmission equipment may take any desired form, and different transmission media and connections may be used. Examples of connections include wired, fiber optic, acoustic, wireless connections and mud pulse telemetry.

The processor may be configured to receive data from the tool 24 and/or process the data to generate formation parameter information. In one embodiment, the surface processing unit 28 is configured as a surface drilling control unit which controls various drilling parameters such as rotary speed, weight-on-bit, drilling fluid flow parameters and others.

In one embodiment, the tool 24 is configured as a downhole logging tool. As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

Figure 2:
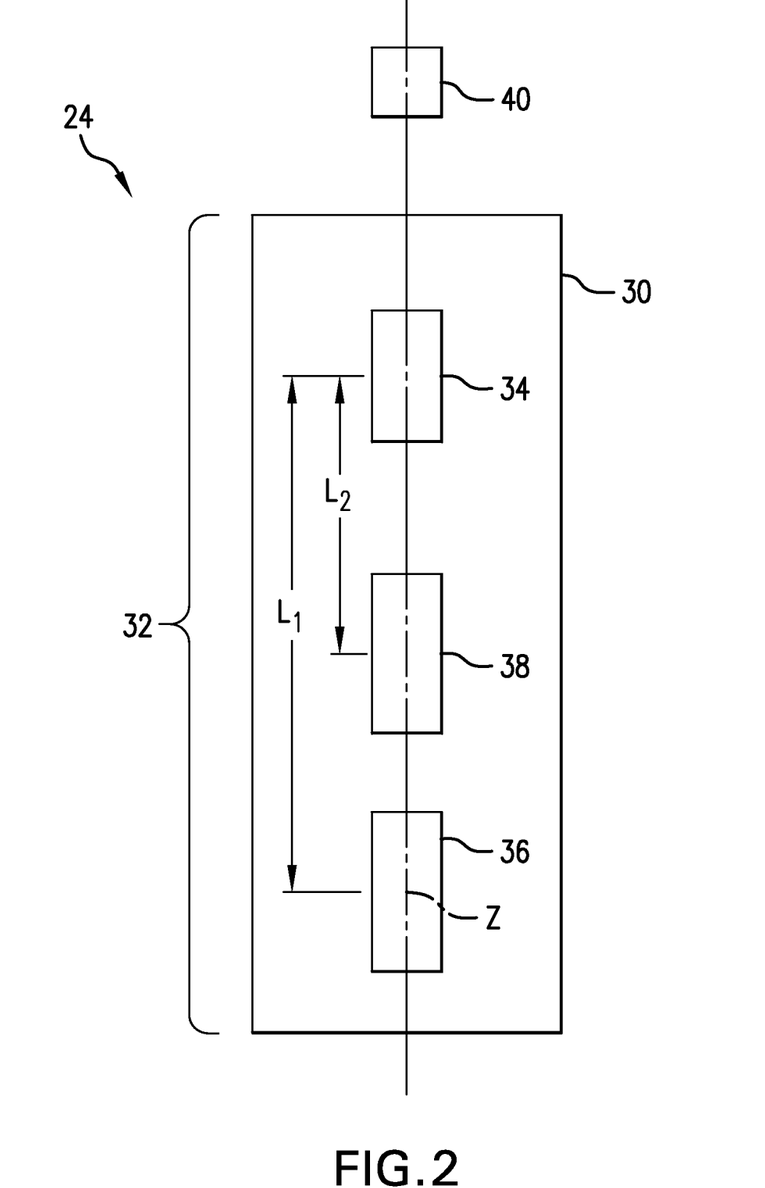
FIG. 2 depicts an exemplary embodiment of a downhole tool.

FIG. 2 illustrates an embodiment of the downhole tool 24. The downhole tool 24 is disposed in a carrier such as a housing 30. The housing is incorporated as or in a downhole component such as a borehole string section, a drill pipe or a drill collar. The housing 30 and/or other component are typically made from a conducting material such as steel. The tool 24 includes a resistivity measurement assembly 32 incorporating at least one electromagnetic (EM) source and multiple EM receivers. An EM transmitter 34 (e.g., a transmitter antenna or coil) is configured to emit an electric or magnetic field into the formation 16 and induce a magnetic field response that is measured by one or more EM receivers 36 and 38 (e.g., receiver coils). An electric source 40, which may be disposed downhole or at a surface location, is configured to apply electric current to the transmitter 34.

In one embodiment, the measurement assembly 32 is configured to perform an inductive transient EM measurement operation. The source 40 applies transient pulses of current to the transmitter 34, which induces current in the formation 16. The current generates a magnetic field that is detected by the receivers 36 and 38.

The tool 24 utilizes electromagnetic measurements to determine the electrical conductivity of formations surrounding the borehole. Various types of tools may be employed to measure formations at various "depths of investigations" or DOI, which correspond to distances from the tool and/or borehole in a direction perpendicular to an axis of the tool and/or borehole (e.g., the Z axis of FIG. 2), referred to herein as "radial distances." Transient EM methods are particularly useful for ultra-deep investigations (e.g., radial distances of 10 s to hundreds of meters from the tool and/or borehole). Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter.

In one embodiment, the transmitter and the receivers are disposed axially relative to one another. An "axial" location refers to a location along the Z axis that extends along a length of the tool 24 and/or borehole 14. The first receiver 36 is positioned at a selected axial distance L1 from the transmitter 34, and the second receiver 38 is positioned at a shorter axial distance L2 from the transmitter. For example, the first and second distances are selected to have a specific ratio, e.g., L1 is twice that of L2.

In one embodiment, the receivers 36 and 38 are identical or at least substantially identical, such that they would measure the same signal if the receivers are disposed at the same axial and radial location. For example, the receivers 36 and 38 each have the same (or at least substantially the same) configuration parameters. Such parameters include the number and diameter of coil windings, the coil material, the effective area, the magnetic field to voltage conversion factor and/or voltage gain.

Figure 3:
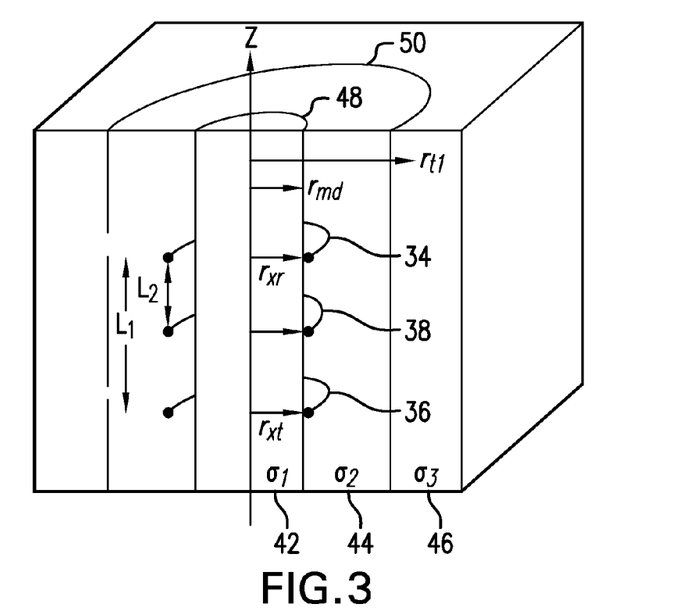
FIG. 3 depicts a structure representing an exemplary configuration of the downhole tool of FIG. 2 in an earth formation.

FIG. 3 shows an exemplary structure representing a configuration of the tool 24 with the formation 16. The structure includes a first zone 42 substantially defined by a metal drill collar, pipe or other conductive carrier with conductivity $\sigma_1$, a transition layer 44 having a conductivity $\sigma_2$, and a remote formation layer 46 having a conductivity $\sigma_3$ The magnetic permeability of the entire space is $\mu$. As illustrated, the boundary 48 separating the metal carrier from the transition layer and the boundary 50 separating the regions of transition layer and remote formation share a common Z-axis. As measured from the Z-axis, the radius of boundary 48 is labeled as $r_{md}$, and the radius of boundary 50 is labeled as $r_{tl}$. An electromagnetic field is excited by the transmitter current loop 34 of radius, $r_{xt}$, and is measured by receivers 36 and 38 of radius $r_{xr}$.

Figure 4:
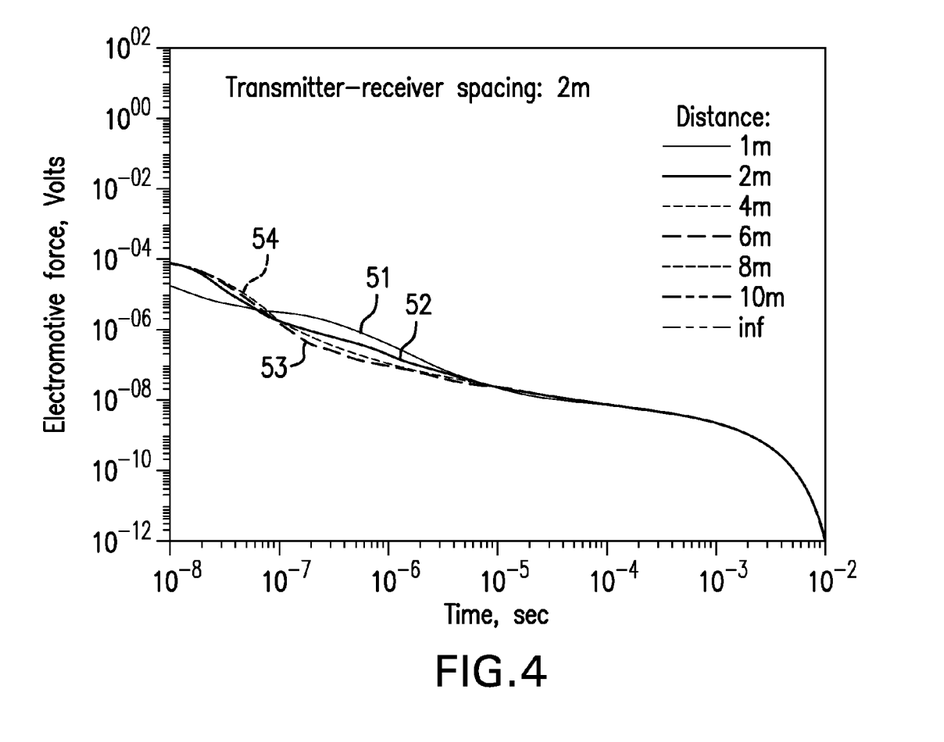
FIG. 4 depicts exemplary transient electromagnetic responses obtained in the presence of a typical conductive pipe.

FIG. 4 shows exemplary transient responses obtained in the presence of a typical conductive pipe. The conductivity is $\sigma=1.4*10^6$ S/m. Curves 51, 52 and 53 indicate responses at radial distances (perpendicular to the Z axis) of 1, 2, and 4 meters respectively to a remote boundary (e.g., boundary 204). Response curve 54 represents the response to a remote boundary at an infinite distance. Response curve 54 is nearly indistinguishable from and overlaps response curves at a distance of 6, 8 and 10 meters. FIG. 4 illustrates the fact that at late times corresponding to deep investigation, the conductive pipe signal typically dominates the transient response of the earth's formations by at least an order of magnitude. Even when using other methods to remove the main part of the conductive pipe signal (e.g., modeling results for the pipe signal in air, lab measurements of the pipe signal, by using bucking coil), there remains a part of the pipe signal left due to instability of the pipe signal caused by the drilling environment. The causes of the instability can be temperature dependence of electric conductivity of the pipe, changing effective distance between the transmitter and the receiver due to bending of the drill pipe, changing effective cross-sectional area of the receiver and transmitter and others. The instability of pipe signal may produce low frequency noise comparable or exceeding the formation signal especially at late times.

Figure 5:
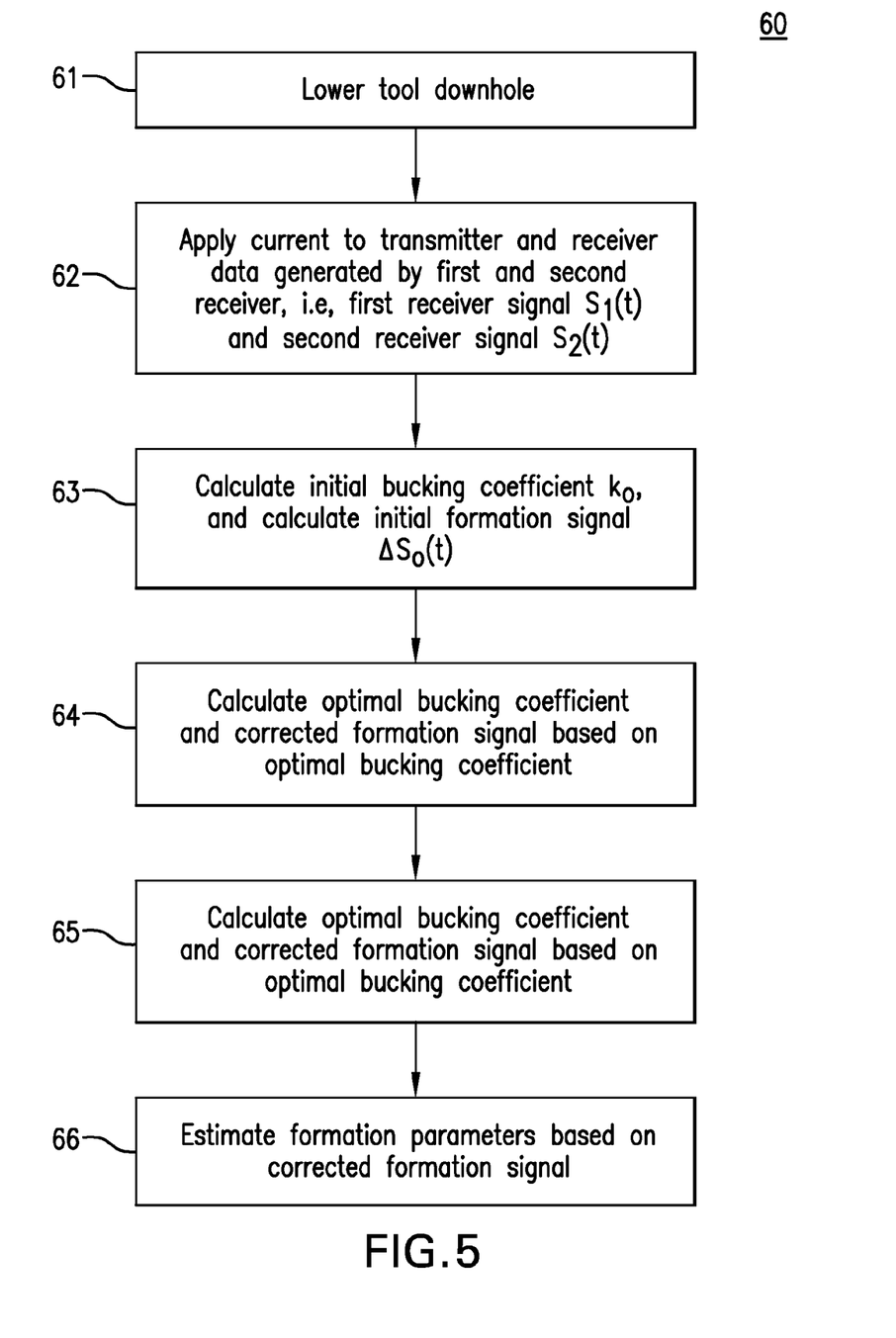
FIG. 5 is a flow chart providing an exemplary method of processing electromagnetic signal data and/or measuring formation properties.

FIG. 5 illustrates a method 60 for processing electromagnetic (EM) signal data and measuring parameters of an earth formation using electromagnetic signal measurements. The method includes processing and/or analyzing received signals to reduce and/or eliminate the signal corresponding to conductive downhole components such as drill collars or drill pipes from EM data, such as transient EM (TEM) data. The method 60 includes one or more of stages 61-66 described herein. The method may be performed continuously or intermittently as desired. The method is described herein in conjunction with the tool 24, although the method may be performed in conjunction with any number and configuration of processors, sensors and tools. The method may be performed by one or more processors or other devices capable of receiving and processing measurement data. In one embodiment, the method includes the execution of all of stages 61-66 in the order described. However, certain stages 61-66 may be omitted, stages may be added, or the order of the stages changed.

In the first stage 61, the tool 24 is lowered in the borehole. The tool 24 may be lowered, for example, during a drilling operation, LWD operation or via a wireline.

In the second stage 62, current is applied to the transmitter 34 and the receivers 36 and 38 receive signals from the formation during a selected time interval. An electric current is applied to the transmitter 34, which induces a pulsed electric current in the formation. This current in turn generates an associated second magnetic field that is measured by the receivers 36 and 38 over one or more measurement time intervals. It is noted that each receiver signal can encompass one or multiple signals over one or more time intervals. The first receiver 36 (also referred to as receiver $R_1$) is considered the main measurement receiver, for which a time domain signal $S_1(t)$ is measured over a selected time interval. The second receiver 38 (also referred to as receiver $R_2$) is used to measure a time domain signal $S_2(t)$ over the selected time interval, and is provided to compensate for undesirable parasitic signals.

The measured signals $S_1(t)$ and $S_2(t)$ are then combined using a correctable bucking coefficient to derive a corrected formation signal that is at least substantially unaffected by conductive components such as a drill pipe. In one embodiment, the combination is a linear combination.

For example, a transformation is applied to the second receiver signal $S_2(t)$ to generate a transformed signal. The transformed signal is then subtracted from the first receiver signal $S_1(t)$ to generate a corrected signal that is entirely or at least substantially entirely free of the portion of the first signal due to the conductive drill pipe or other downhole component.

In one embodiment, the second receiver signal $S_2(t)$ is transformed by multiplying the receiver signal $S_2(t)$ by the bucking coefficient. The bucking coefficient may be a constant based on, e.g., a ratio between the distance $L_1$ from $R_1$, to the transmitter (T) and the distance $L_2$ from $R_2$ to the transmitter T. An exemplary ratio is $(L_2)^3/(L_1)^3$.

In the third stage 63, an initial bucking coefficient k is calculated based on, e.g., a ratio between $L_1$ and $L_2$. In one embodiment, the initial bucking coefficient k is calculated based on the following equation:

$$k = \frac{M_1}{M_2} \frac{L_2^3}{L_1^3}, \quad (12)$$

where $M_1(t)$ and $M_2(t)$ are the magnetic moments of the first and second receivers, respectively.

An initial signal $\Delta S_0(t)$ is calculated by combining the two signals $S_1(t)$ and $S_2(t)$ using the initial bucking coefficient. This signal $\Delta S_0(t)$ is referred to an initial formation signal, which is an initial estimation of a corrected formation signal for which the influence of a drill string or other conductive components (e.g., a parasitic signal) is reduced or eliminated. In one embodiment, the initial formation signal $\Delta S_0(t)$ is calculated according to the equation:

$$\Delta S_0(t) = S_1(t) - k S_2(t) \qquad (13)$$

In the fourth stage 64, an optimal bucking coefficient, i.e., a value for the bucking coefficient that most substantially eliminates the parasitic signal, is calculated by estimating a plurality of signals $\Delta S(t)$ using a plurality of bucking coefficients selected based on the value of the initial bucking coefficient. The plurality of bucking coefficients are selected based on the initial coefficient. For example, a number of coefficients can be selected that are within a selected percentage of the initial coefficient value.

An exemplary range of bucking coefficients has a minimum coefficient $k_{min}=0.75 \cdot k$ and a maximum coefficient $k_{max}=1.25 \cdot k$. The criteria for selection is not limited to those described herein; the values of the coefficients, the range between $k_{min}$ and $k_{max}$, the number of coefficients, and the interval separating the coefficients can be based around the initial coefficient using empirical data, such as knowledge of formation lithology and previously collected data.

For example, a scan is performed by calculating a plurality of signals $\Delta S(t)$ in the time interval $[t_{min}, t_{max}]$ corresponding to a range of coefficients from $k_{min}$ to $k_{max}$. For example, each signal $\Delta S(t)$ is calculated for a respective bucking coefficient according to equation (13). The time interval is related to the measurement interval, and may be equal to the measurement interval or be some subset thereof. For example, the time interval is selected such that $t_{min} \approx 0.01$ ms and $t_{max} \approx 1$ ms.

From the plurality of the signals $\Delta S(t)$, one of the signals (referred to as the optimal signal $\Delta S(t)_{opt}$) is selected that corresponds to the signal that has or approaches a zero crossing (i.e., a time point at which the signal crosses or approaches a value of zero) at the latest time. The bucking coefficient corresponding to this optimal signal is referred to as an optimal bucking coefficient $k_{opt}$, and is the coefficient that provides maximum suppression of the drill pipe parasitic signal while maximizing information content from the formation.

In one embodiment, the signals $S_1(t)$ and $S_2(t)$ are statistically analyzed, such as via a data or curve fitting technique, prior to combining the signals. For example, a least squares fit of $S_1(t)$ and $S_2(t)$ signals is performed before combining the signals according to the formula (13) to estimate the initial formation signal and the plurality of formation signals.

In the fifth stage 65, the optimal coefficient $k_{opt}$ can be used in conjunction with subsequent electromagnetic measurements to calculate formation signals. The optical coefficient $k_{opt}$ may be recalculated at any later point, e.g., periodically after a certain number of measurements and/or in response to changing downhole conditions.

In the sixth stage 66, properties of the formation, such as electrical conductivity of the formation, are estimated based on formation signals calculated using the optimal coefficient. For example, inversion of calculated formation signals provides parameters of the surrounding formation including resistivity, distance to an interface in the formation (geosteering), and distance or ahead of a drill.

FIGS. 6-11 illustrate examples showing the validity and usefulness of the method 60 for correction of bucking coefficient in transient MWD measurements. The following examples utilize a three-coil system including a transmitter T and two axially spaced receivers $R_1$ and $R_2$. The spacing $L_1$ between the transmitter T and the first receiver $R_1$ is 7 meters, and the spacing $L_2$ between the transmitter T and the second receiver $R_2$ is 5 meters. It is assumed that the magnetic moments of the receivers are equal ($M_1=M_2$). In the below examples, under each coil is a 0.1 meter long ferrite with $\mu=100$ and a 75 cm copper shield around the drill pipe. Both copper and ferrite components are centered with respect to each coil.

Figure 6:
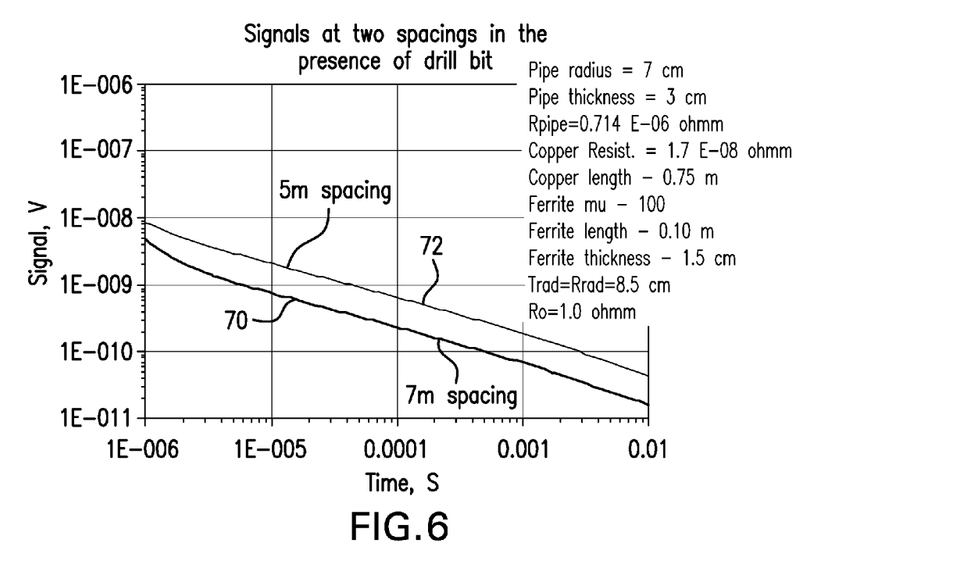
FIG. 6 depicts exemplary electromagnetic receiver signals.

Referring to FIG. 6, in a first example, the formation includes homogeneous media with a resistivity of 1 ohm-m. A curve 70 shows a simulated transient signal $S_1(t)$ for the first receiver $R_1$ and a curve 72 shows a simulated transient signal $S_2(t)$ for the second receiver $R_2$. An initial bucking coefficient is calculated as $k=L_2^3/L_1^3=0.3645$. An initial formation signal is calculated according to formula (13).

Figure 7:
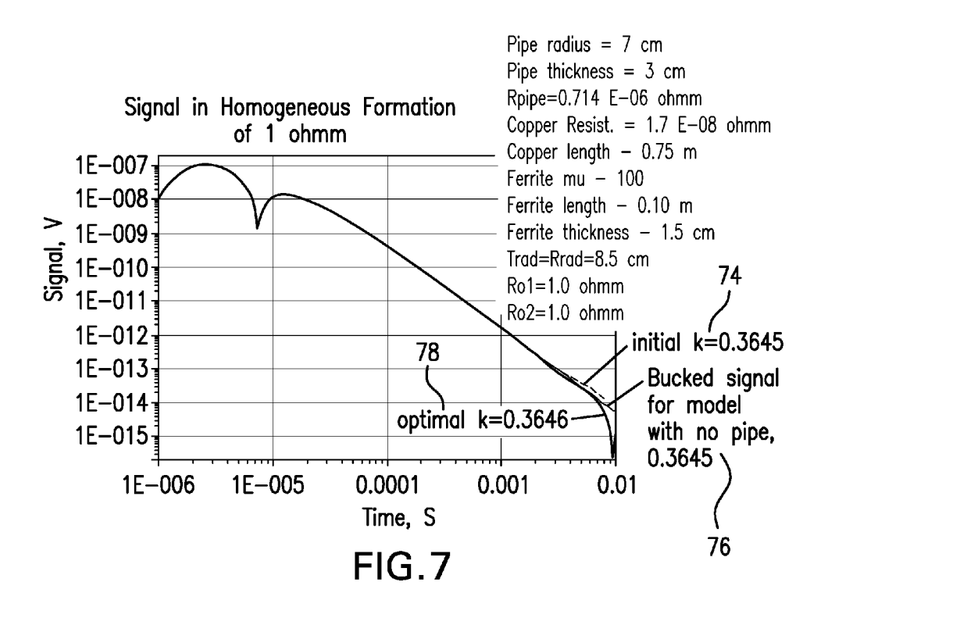
FIG. 7 depicts exemplary formation signals derived according to the method of FIG. 5 for a homogeneous formation.

FIG. 7 shows the initial formation signal $\Delta S_0(t)$ as curve 74. A reference signal 76 is shown that corresponds to the modeled formation signal with no pipe or other conductive component included. The curves 74 and 76 substantially overlap within the measurement time interval and thus no further processing is needed to update the bucking coefficient, i.e., the initial bucking coefficient can be selected as the optimal coefficient. If additional formation signals are calculated based on a range of bucking coefficients around the initial coefficient, an optimal curve 78 is derived based on the selection criteria described above (the curve with the latest zero crossing). This optimal curve 78 slightly better coincides with the reference curve 76. Thus, in this example, the optimal bucking coefficient (k=0.3646) only slightly deviates from the initial bucking coefficient value of 0.3645.

Figure 8:
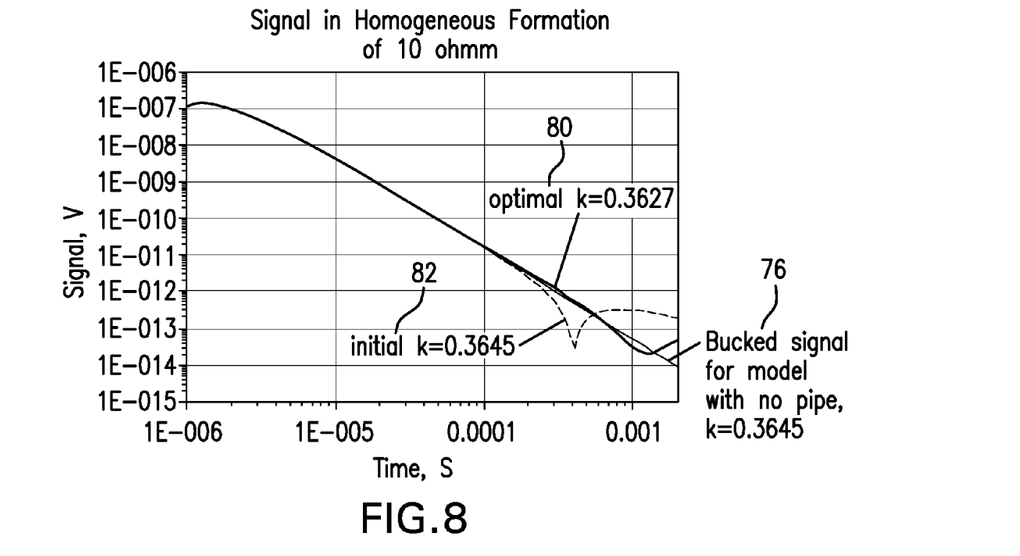
FIG. 8 depicts exemplary formation signals derived according to the method of FIG. 5 for a homogeneous formation.

Referring to FIG. 8, the situation is different if the formation becomes more resistive. In a second example, the formation includes homogeneous media with a resistivity of 10 ohm-m. An optimal bucking coefficient k=0.3627 leads to a formation signal 80, which is much closer to the to the reference curve 76 than the initial formation signal 82 calculated using the initial bucking coefficient.

Figure 9:
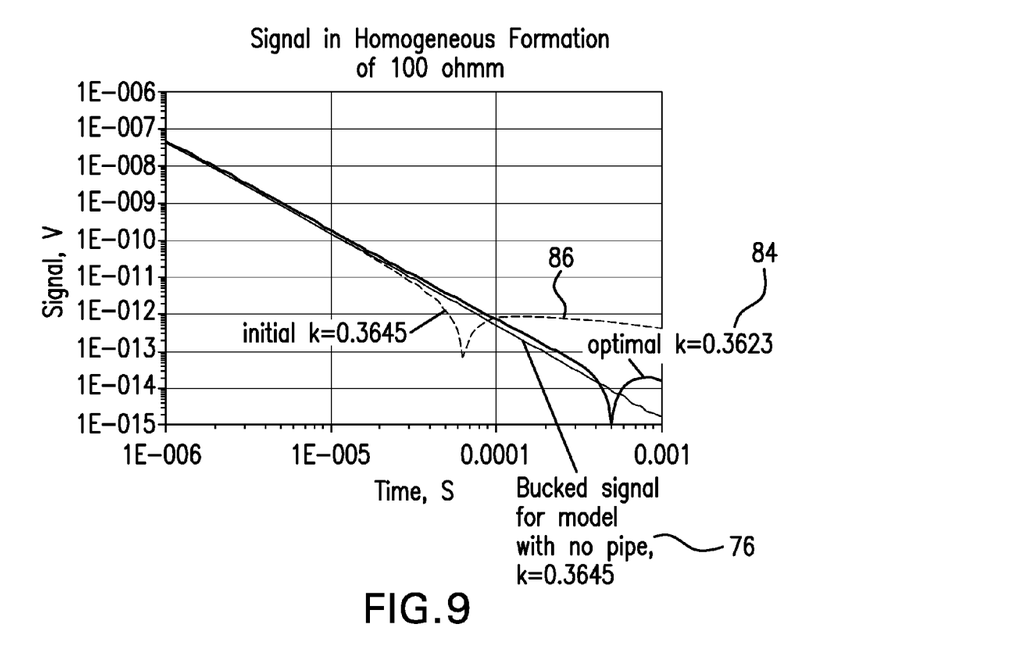
FIG. 9 depicts exemplary formation signals derived according to the method of FIG. 5 for a homogeneous formation.

Referring to FIG. 9, correction using the method 60 becomes even more pronounced when the resistivity of the formation increases. FIG. 9 illustrates an example in which the formation includes homogeneous media having a resistivity of 100 ohm-m. A curve 84, corresponding to the optimal coefficient k=0.3623, has an overlap with the reference curve 76 up to a time moment of about 4E-04 s, which is one decade wider than the range of overlap between the reference curve 76 and the curve 86, which corresponds to the initial bucking coefficient of k=0.3645.

Figure 10:
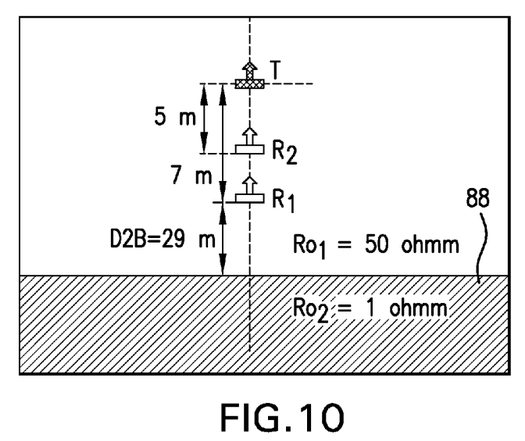
FIG. 10 depicts an electromagnetic measurement tool disposed in an exemplary formation.
Figure 11:
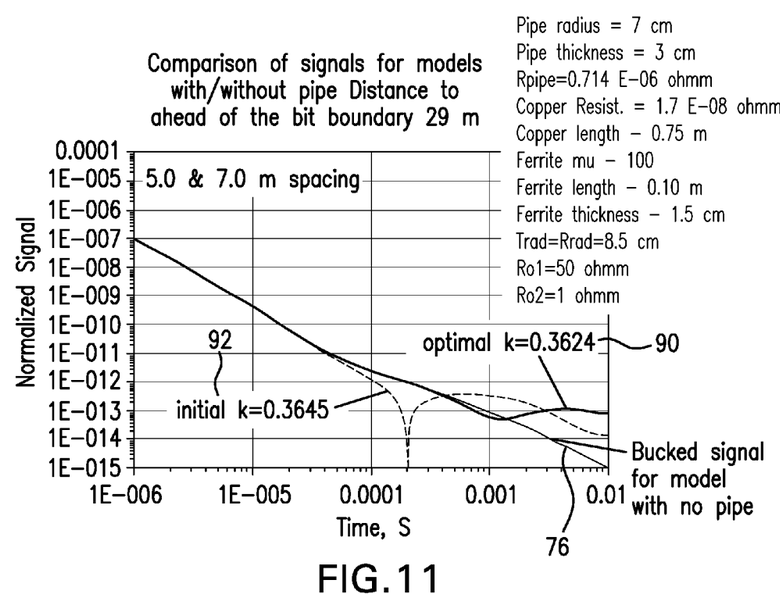
FIG. 11 depicts exemplary formation signals derived according to the method of FIG. 5 for the formation depicted in FIG. 10.

FIGS. 10 and 11 show an example of how the correction performs when a formation includes two layers and has a boundary that is placed ahead of the tool 24 (e.g., a drill bit or other component). In this example, the formation includes a boundary 88 between a formation layer surrounding the tool having a resistivity $Ro_1$ of 50 ohm-m, and a formation layer ahead of the tool having a resistivity $Ro_2$ of 1 ohm-m. The boundary in this example is placed at 29 meters from receiver $R_1$.

Curves 90 and 76, corresponding to the optimal and reference coefficients respectively, are presented in FIG. 11. The curve 90, corresponding to the optimal coefficient k=0.3624, has an overlap with the reference curve 76 up to a time moment of about 1.0E-03 s, while the initial signal (curve 92) derived from the bucking coefficient of k=0.3645 coincides with the reference only until the time moment of 1.0E-04 s. By utilizing calculation of the optimal bucking coefficient as described herein, the formation measurement is accurate by one decade longer in time than the initial signal, which might be translated into about 3 times greater depth of investigation.

The apparatuses and methods described herein provide various advantages over prior art techniques. The apparatuses and methods allow for removing the effects of the drill collar without having to know the changes in the drill collar that occur during downhole operation. Such changes include environmental changes (temperature and pressure) as well as physical changes such as deformation and vibration.

In addition, calculation of an improved adjustable bucking coefficient as described herein permits stronger suppression of undesirable signals due to conductive components while improving information content about electrical properties of a formation. The adjustable bucking coefficient permits an effective extraction of formation signals from electromagnetic measurements. Generally, some of the teachings herein are reduced to an algorithm that is stored on machine-readable media. The algorithm is implemented by a computer and provides operators with desired output.

The systems described herein may be incorporated in a computer coupled to the tool 24. Exemplary components include, without limitation, at least one processor, storage, memory, input devices, output devices and the like. As these components are known to those skilled in the art, these are not depicted in any detail herein. The computer may be disposed in at least one of a surface processing unit and a downhole component.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of processing electromagnetic signal data, the method comprising:

receiving transient electromagnetic (TEM) signal data representing electromagnetic (EM) signals detected by at least two receivers in a downhole tool disposed in an earth formation in response to inducing a pulsed current in the earth formation, the downhole tool including at least one conductive component;

estimating an initial bucking coefficient based on relative positions of the at least two receivers;

combining the TEM signal data using the initial bucking coefficient to estimate an initial formation signal;

selecting a plurality of bucking coefficient values from a range of bucking coefficient values, the range of bucking coefficient values including the initial bucking coefficient and estimating a plurality of formation signals, each formation signal corresponding to one of the plurality of bucking coefficients; and selecting an optimal bucking coefficient from one of the initial bucking coefficient and the plurality of bucking coefficients based on the plurality of formation signals, the optimal bucking coefficient providing suppression of parasitic signals due to the at least one conductive component, the optimal bucking coefficient selected by identifying a formation signal from one of the initial formation signal and the plurality of formation signals that shows a smallest effect due to the at least one conductive component, and selecting a bucking coefficient corresponding to the identified formation signal as the optimal bucking coefficient.

2. The method of claim 1, wherein selecting the optimal bucking coefficient includes:

scanning the plurality of bucking coefficients ranging from a minimum coefficient $k_{min}$ to a maximum coefficient $k_{max}$ to calculate the plurality of formation signals corresponding to the plurality of bucking coefficients from $k_{min}$ to $k_{max}$; and selecting, as the optimal bucking coefficient, the bucking coefficient that corresponds to the formation signal having a zero crossing at the latest time.

3. The method of claim 1, wherein the range of bucking coefficient values include values within a selected percentage of the initial bucking coefficient.

4. The method of claim 1, wherein the initial formation signal is estimated by linearly combining the EM signals using the initial bucking coefficient, and each of the plurality of formation signals is estimated by linearly combining the EM signals using one of the plurality of bucking coefficients.

5. The method of claim 4, wherein the initial bucking coefficient is calculated based on the following equation:

$$k = \frac{M_1}{M_2} \frac{L_2^3}{L_1^3},$$

wherein $M_1$ and $M_2$ are the magnetic moments of the first and second receivers, respectively.

6. The method of claim 5, wherein the magnetic moments $M_1$ and $M_2$ are selected to satisfy the following condition:

$$\frac{M_1}{M_2} = \frac{L_1^3}{L_2^3}.$$

7. The method of claim 1, wherein the downhole tool includes a conductive carrier, a transmitter, a first receiver disposed at a first axial distance $L_1$ from the transmitter, and a second receiver disposed at a second axial distance $L_2$ from the transmitter that is less than the first axial distance, and the EM signals include a first EM signal $S_1(t)$ detected by the first receiver and a second EM signal $S_2(t)$ detected by the second receiver.

8. The method of claim 7, wherein the initial formation signal and each of the plurality of formation signals are calculated based on the following equation:

$$\Delta S(t)=S_1(t)-k \cdot S_2(t),$$

wherein k is the initial bucking coefficient or one of the plurality of bucking coefficients.

9. The method of claim 7, further comprising performing a data fit of the first EM signal $S_1(t)$ and the second EM signal $S_2(t)$ prior to estimating the initial formation signal and the plurality of formation signals.

10. An apparatus for processing electromagnetic signal data, the apparatus comprising:
a downhole tool configured to be disposed in a borehole in an earth formation, the downhole tool including a conductive carrier, a transmitter, a first receiver disposed at a first axial distance $L_1$ from the transmitter, and a second receiver disposed at a second axial distance $L_2$ from the transmitter that is less than the first axial distance; and
a processor configured to receive transient electromagnetic (TEM) signal data representing a first EM signal $S_1(t)$ detected by the first receiver and a second EM signal $S_2(t)$ detected by the second receiver in response to inducing a pulsed current in the earth formation, the processor configured to perform:
estimating an initial bucking coefficient based on at least the first axial distance $L_1$ and the second axial distance $L_2$;
combining the first EM signal $S_1(t)$ and the second EM signal $S_2(t)$ using the initial bucking coefficient to estimate an initial formation signal;
selecting a plurality of bucking coefficient values from a range of bucking coefficient values, the range of bucking coefficient values including the initial bucking coefficient and estimating a plurality of formation signals, each formation signal corresponding to one of the plurality of bucking coefficients; and
selecting an optimal bucking coefficient from one of the initial bucking coefficient and the plurality of bucking coefficients based on the plurality of formation signals, the optimal bucking coefficient providing suppression of parasitic signals due to the at least one conductive component, the optimal bucking coefficient selected by identifying a formation signal from one of the initial formation signal and the plurality of formation signals that shows a smallest effect due to the at least one conductive component, and selecting a bucking coefficient corresponding to the identified formation signal as the optimal bucking coefficient.

11. The apparatus of claim 10, wherein the initial formation signal and each of the plurality of formation signals are calculated based on the following equation:

$$\Delta S(t)=S_1(t)-k \cdot S_2(t),$$

wherein k is the initial bucking coefficient or one of the plurality of bucking coefficients.

12. The apparatus of claim 10, wherein the initial bucking coefficient is calculated based on the following equation:

$$k = \frac{M_1}{M_2} \frac{L_2^3}{L_1^3},$$

wherein $M_1$ and $M_2$ are the magnetic moments of the first and second receivers, respectively.

13. The apparatus of claim 10, wherein selecting the optimal bucking coefficient includes:
scanning the plurality of bucking coefficients ranging from a minimum coefficient $k_{min}$ to a maximum coefficient $k_{max}$ to calculate the plurality of formation signals corresponding to the plurality of bucking coefficients from $k_{min}$ to $k_{max}$; and
selecting, as the optimal bucking coefficient, the bucking coefficient that corresponds to the formation signal having a zero crossing at the latest time.

14. The apparatus of claim 10, wherein the range of bucking coefficient values include values within a selected percentage of the initial bucking coefficient.

15. A non-transitory computer readable medium comprising computer-executable instructions for processing electromagnetic signal data by implementing a method comprising:
receiving transient electromagnetic (TEM) signal data representing electromagnetic (EM) signals detected by at least two receivers in a downhole tool disposed in an earth formation in response to inducing a pulsed current in the earth formation, the downhole tool including at least one conductive component;
estimating an initial bucking coefficient based on relative positions of the at least two receivers;
combining the TEM data using the initial bucking coefficient to estimate an initial formation signal;
selecting a plurality of bucking coefficient values from a range of bucking coefficient values, the range of bucking coefficient values including the initial bucking coefficient and estimating a plurality of formation signals, each formation signal corresponding to one of the plurality of bucking coefficients; and
selecting an optimal bucking coefficient from one of the initial bucking coefficient and the plurality of bucking coefficients based on the plurality of formation signals, the optimal bucking coefficient providing suppression of parasitic signals due to the at least one conductive component, the optimal bucking coefficient selected by identifying a formation signal from one of the initial formation signal and the plurality of formation signals that shows a smallest effect due to the at least one conductive component, and selecting a bucking coefficient corresponding to the identified formation signal as the optimal bucking coefficient.

16. The computer readable medium of claim 15, wherein the initial formation signal is estimated by linearly combining the EM signals using the initial bucking coefficient, and each of the plurality of formation signals is estimated by linearly combining the EM signals using one of the plurality of bucking coefficients.

17. The computer readable medium of claim 15, wherein selecting the optimal bucking coefficient includes:
scanning the plurality of bucking coefficients ranging from a minimum coefficient $k_{min}$ to a maximum coefficient $k_{max}$ to calculate the plurality of formation signals $\Delta S(t)$ corresponding to the plurality of bucking coefficients from $k_{min}$ to $k_{max}$; and
selecting, as the optimal bucking coefficient, the bucking coefficient that corresponds to the formation signal having a zero crossing at the latest time.

18. The computer readable medium of claim 15, wherein the range of bucking coefficient values include values within a selected percentage of the initial bucking coefficient.

19. The computer readable medium of claim 15, wherein the downhole tool includes a conductive carrier, a transmitter, a first receiver disposed at a first axial distance $L_1$ from the transmitter, and a second receiver disposed at a second axial distance $L_2$ from the transmitter that is less than the first axial distance, and the initial formation signal and each of the plurality of formation signals are calculated based on the following equation:

$$\Delta S(t) = S_1(t) - k \cdot S_2(t),$$

wherein k is the initial bucking coefficient or one of the plurality of bucking coefficients, $S_1(t)$ is a first EM signal detected by the first receiver and $S_2(t)$ is a second EM signal detected by the second receiver.

20. The computer readable medium of claim 19, wherein the initial bucking coefficient is calculated based on the following equation:

$$k = \frac{M_1}{M_2} \frac{L_2^3}{L_1^3},$$

wherein $M_1$ and $M_2$ are the magnetic moments of the first and second receivers, respectively.

* * * * *